(12) United States Patent
Vittur et al.

(10) Patent No.: US 12,202,775 B2
(45) Date of Patent: Jan. 21, 2025

(54) PACKAGING FOR SOLID HYDROGEN SULFIDE SCAVENGERS

(71) Applicant: BAKER HUGHES OILFIELD OPERATIONS LLC, Houston, TX (US)

(72) Inventors: Brandon M. Vittur, Sugar Land, TX (US); Jian Zou, Sugar Land, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 30 days.

(21) Appl. No.: 17/430,534

(22) PCT Filed: Aug. 14, 2020

(86) PCT No.: PCT/US2020/046351
§ 371 (c)(1),
(2) Date: Aug. 12, 2021

(87) PCT Pub. No.: WO2022/035438
PCT Pub. Date: Feb. 17, 2022

(65) Prior Publication Data
US 2023/0167031 A1     Jun. 1, 2023

(51) Int. Cl.
*C04B 40/00* (2006.01)
*C04B 26/26* (2006.01)
(Continued)

(52) U.S. Cl.
CPC .......... *C04B 40/0042* (2013.01); *C04B 26/26* (2013.01); *C04B 40/0046* (2013.01);
(Continued)

(58) Field of Classification Search
CPC ............................... C10C 3/00; C08L 2555/50
See application file for complete search history.

(56) References Cited

U.S. PATENT DOCUMENTS 7,544,239 B2   6/2009  Buras et al.
8,034,231 B2  10/2011  Draper
(Continued)

FOREIGN PATENT DOCUMENTS

CN        106398246 A  *  2/2017  .............. B01J 13/12

OTHER PUBLICATIONS

International Search Report for International Application No. PCT/US2020/046351, International Filing Date Aug. 14, 2020, Date of Mailing May 21, 2021, 5 pages.
(Continued)

*Primary Examiner* — Vickey Nerangis
(74) *Attorney, Agent, or Firm* — Baker Hughes Company

(57) ABSTRACT

A method of reducing hydrogen sulfide emissions from an asphalt or bitumen composition comprises releasing a solid hydrogen sulfide scavenger from an additive package, which comprises the solid hydrogen sulfide scavenger disposed in a sealed pouch; and contacting the asphalt or bitumen composition with the released solid hydrogen sulfide scavenger. The sealed pouch is formed from a pouch material, which includes an polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing.

12 Claims, 2 Drawing Sheets

(51) Int. Cl.
*C10C 3/00* (2006.01)
*C10C 3/02* (2006.01)
*C04B 103/00* (2006.01)

(52) U.S. Cl.
CPC ............... *C10C 3/00* (2013.01); *C10C 3/02* (2013.01); *C04B 2103/0078* (2013.01); *C08L 2555/50* (2013.01)

(56) References Cited

U.S. PATENT DOCUMENTS

| | | |
|---|---|---|
| 8,523,994 B2 | 9/2013 | Draper et al. |
| 9,068,128 B2 | 6/2015 | Stark et al. |
| 9,334,448 B2 | 5/2016 | Stark et al. |
| 2003/0013783 A1 | 1/2003 | Kommareddi et al. |
| 2006/0081152 A1 | 4/2006 | Buras et al. |
| 2009/0145330 A1 | 6/2009 | Draper et al. |
| 2009/0206003 A1 | 8/2009 | Draper |
| 2017/0022109 A1 | 1/2017 | Poland et al. |
| 2017/0306152 A1* | 10/2017 | Shulga ............... C08K 9/10 |
| 2018/0163050 A1 | 6/2018 | Mouazen et al. |
| 2019/0127710 A1* | 5/2019 | Lehrer ........... C12Y 205/01047 |
| 2020/0181507 A1 | 6/2020 | Martin et al. |

OTHER PUBLICATIONS

Written Opinion for International Application No. PCT/US2020/046351, International Filing Date Aug. 14, 2020, Date of Mailing May 21, 2021, 3 pages.

* cited by examiner

PACKAGING FOR SOLID HYDROGEN SULFIDE SCAVENGERS

CROSS REFERENCE TO RELATED APPLICATIONS

This application is a National Stage application of PCT/US2020/046351, filed Aug. 14, 2020, the disclosure of which is incorporated by reference herein in its entirety.

BACKGROUND

Asphalt and bitumen are useful in a number of applications such as road construction, membranes for waterproofing roofs, coatings, and shingle construction.

A potential problem related to the use of asphalt and bitumen compositions concerns the release of hydrogen sulfide during their process of preparation or their use. Hydrogen sulfide may be present in asphalt and bitumen as a naturally occurring material. Asphalt and bitumen can also be contaminated with sulfur compounds which can break down releasing hydrogen sulfide. Hydrogen sulfide is a colorless gas with an offensive odor. Removal of hydrogen sulfide is warranted because hydrogen sulfide is highly toxic, corrosive, and flammable.

Hydrogen sulfide scavengers have been used for reducing hydrogen sulfide emissions during the manufacture or the use of asphalt and bitumen compositions. Many metal-based hydrogen sulfide scavengers are in solid form, and are often converted to liquid form by chemical reactions or suspended in liquids before they are transported and used, which decreases the concentration of hydrogen sulfide scavengers or increases product costs. Despite all the advances, there is a need for alternative hydrogen sulfide scavengers for asphaltene and bitumen compositions. It would be a further advantage if such hydrogen sulfide scavengers can be conveniently and economically manufactured, stored, transported, and applied with high scavenger concentrations.

BRIEF DESCRIPTION

A method of reducing hydrogen sulfide emissions from an asphalt or bitumen composition comprises releasing a solid hydrogen sulfide scavenger from an additive package, the additive package comprising the solid hydrogen sulfide scavenger disposed in a sealed pouch; and contacting the asphalt or bitumen composition with the solid hydrogen sulfide scavenger released from the additive package. The sealed pouch is formed from a pouch material, which includes an polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing.

BRIEF DESCRIPTION OF THE DRAWINGS

The following descriptions should not be considered limiting in any way. With reference to the accompanying drawings, like elements are numbered alike.

DETAILED DESCRIPTION

Metal-based hydrogen sulfide scavengers are typically converted into liquid form via chemical reactions or dispersed or suspended in solvents before these scavengers are transported to the sites where they are used. Applicants have found that solid hydrogen sulfide scavengers can be packaged in removable pouches. The use of additive packages eliminates the need for suspending aids or other chemicals and allows solid hydrogen sulfide scavengers and optionally other additives to be applied at maximum concentrations while removing the challenges associated with making liquid scavengers or making suspensions/dispersions.

These additive packages have a sealed pouch and a solid hydrogen sulfide scavenger disposed in the sealed pouch. With the protection of the sealed pouch, hydrogen sulfide scavengers can be transported and stored in a solid, non-dispersion form. Once the additive packages are transported to a desired location, the solid hydrogen sulfide scavenger can be released from the sealed pouch and used in asphalt/bitumen compositions to reduce the emission of hydrogen sulfide during the process of manufacturing or using these asphalt and bitumen compositions.

As used herein, the term "asphalt" or "asphalt composition" refers to any of a variety of materials that are solid or semisolid at 25° C. and which may gradually liquefy when heated, and in which the predominant constituents are naturally occurring bitumens (or kerogens) or which are bitumen like materials obtained as residues in, for example, petroleum refining. In addition to bitumens, asphalt or asphalt compositions also include inorganic and/or synthetic fillers such as fines, sand, stone chips, synthetic fillers, or a combination comprising at least one of the foregoing.

Hydrogen sulfide may be present in asphalt and bitumen as a naturally occurring material, especially in asphalts derived from kerogens. Asphalt and bitumen compositions may also contain other sulfur compounds. Any such material which has a sulfur component may emit hydrogen sulfide when the asphalt or bitumen compositions are heated or mixed with certain process additives. As an example, heating during refining, such as in a distillation unit or within a cracking unit may cause the production of hydrogen sulfide from materials already present in the asphalt and bitumen compositions.

The additive packages described herein can be used to mitigate or eliminate the gaseous emissions of hydrogen sulfide from asphalt and bitumen compositions. (also referred to as "scavenging") The scavenging may occur during the process of manufacturing, or using asphalt and bitumen compositions.

Figure 1:
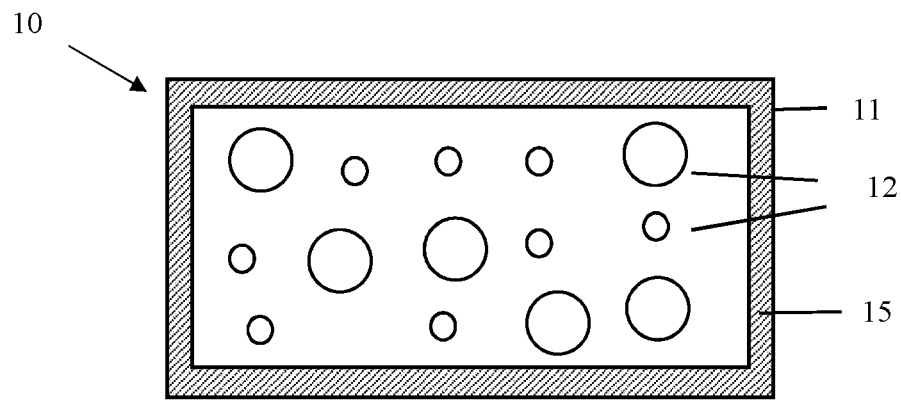
FIG. 1 illustrates an additive package including a solid hydrogen sulfide scavenger disposed in a sealed pouch.
Figure 2:
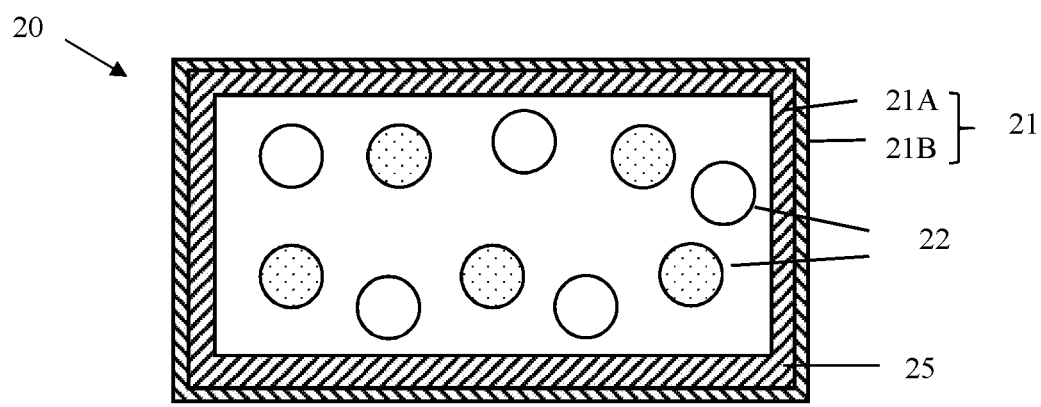
FIG. 2 illustrates an additive package including a solid hydrogen sulfide scavenger disposed in a sealed pouch, wherein the seal pouch has two layers.
Figure 3:
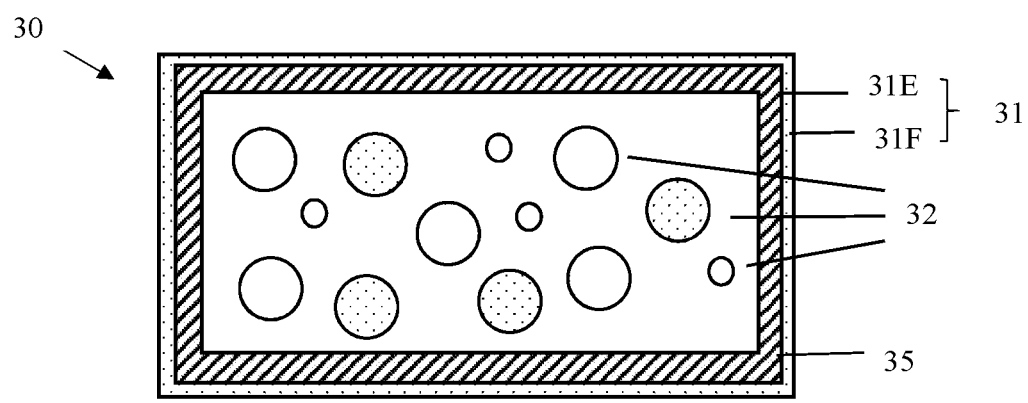
FIG. 3 illustrates an additive package including a solid hydrogen sulfide scavenger disposed in a sealed pouch, wherein the sealed pouch has a coating.

FIGS. 1-3 illustrate additive packages (10, 20, 30) containing a solid hydrogen sulfide scavenger (12, 22, 32) disposed in a sealed pouch (11, 21, 31), wherein the sealed pouch is formed from and comprises a pouch material (15, 25, 35). The sealed pouch can fully encapsulate the solid hydrogen sulfide scavenger.

Suitable pouch materials are those that are dissolvable in a polar solvent and/or a hydrocarbon, and are capable of forming a film. Examples of pouch materials include a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene glycol, polyvinylidene chloride, a polysaccharide or its derivative, or a combination comprising at least one of the foregoing. Examples of polysaccharides and polysaccharide derivatives include chitin, chitosan, chemically modified cellulose, and a chemically modified starch. As used herein, chemically modified cellulose and chemically modified starch refer to cellulose or starch which have been chemically treated such that the modified material is dissolvable in a polar solvent or a hydrocarbon, and is capable of forming a film. Examples of chemically modified starch include starch acetate. Examples of chemically modified cellulose include cellulose acetate and cellulose triacetate. Polyethylene glycol is also known as polyethylene oxide (PEO) or polyoxyethylene (POE). As used herein, polyethylene glycol can have a molecular weight of more than 8,000,000 Daltons. More than one pouch materials can be used. In an embodiment the pouch material comprises an ethylene vinyl alcohol copolymer. The ethylene vinyl alcohol copolymer can contain about 5 to about 95 mol % of the units derived from ethylene, and about 95 to about 5 mol % of units derived from vinyl alcohol.

The sealed pouch can have a single layered structure or a multi-layered structure. A single layered structure means that the sealed pouch has only one layer, and that layer is made from the pouch material as disclosed herein. A multi-layered structure means that the sealed pouch has two or more layers, wherein at least one layer is made from the pouch material as disclosed herein. Without wishing to be bound by theory, it is believed that when the sealed pouch is constructed with multiple layers of different materials, the dissolution of the pouch material can by fine-tuned.

Co-extrusion or other methods known in the art can be used to produce sealed pouches having a multi-layered structure. Optionally adhesive layers are present between various layers of the multi-layered structure. In a sealed pouch having a multi-layered structure, the layer that faces the solid hydrogen sulfide scavenger or other additives is referred to as an inner layer (21A), and the layer defines the exterior of the sealed pouch is referred to as an outer layer (21i). The layer that includes the pouch material as disclosed herein can be an inner layer or an outer layer of the sealed pouch. In an embodiment, each layer of the multi-layer structure independently comprises a pouch material as disclosed herein.

The sealed pouch can have a wall thickness of about 1 to about 2,000 microns, preferably about 1 micron to about 100 microns or about 10 to about 100 microns.

Optionally the sealed pouch can be coated with wax, a silicone, or a combination comprising at least one of the foregoing. The wax can be a natural wax or a synthetic wax. Examples of suitable naturally occurring wax materials include beeswax, candelilla wax, carnauba wax, ozokerite wax, ceresine wax, montan wax. Synthetic waxes include paraffin waxes, and polymers under the tradenames VYBAR™ and POLYWAX™ from Baker Hughes a GE company, LLC. As used herein, silicone includes silicone oils. An example of the silicone is polydimethylsiloxane (PDMS). Advantageously, when the sealed pouches have a coating, the coating material can melt or dissolve during a process of making the asphalt and bitumen compositions and function as a dispersing aid.

The coating (31F) can be disposed on an inner surface of the sealed pouch, an outer surface of the sealed pouch, or both the inner surface and the outer surface of the pouch. As used herein, an inner surface of the pouch means the surface that would otherwise be in direct physical contact with the hydrogen sulfide scavenger and/or other additives. The outer surface (31E) refers to a surface that is opposed to the inner surface. The coating material can be sprayed onto the inner and/or outer surfaces of the sealed pouch in situ during a continuous process of making the additive package.

The additive packages can include one or multiple individually sealed pouches, where at least one of the multiple individually sealed pouches contain a solid hydrogen sulfide scavenger disposed therein. Multiple asphalt additives can reside in the same pouch if these additives are compatible with each other. Incompatible additives can be disposed in different individually sealed pouches.

Figure 4:
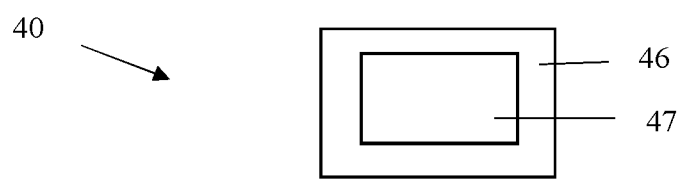
FIG. 4 illustrates an additive package including a sealed pouch disposed insider another sealed pouch, where a solid hydrogen sulfide scavenger is disposed in at least one of the sealed pouches.

As illustrated in FIG. 4, the additive packages (40) can include a first sealed pouch (46) and a second sealed pouch (47) disposed inside the first sealed pouch (46), where a solid hydrogen sulfide scavenger is disposed in the first sealed pouch (46), the second sealed pouch (47), or both.

Figure 5:
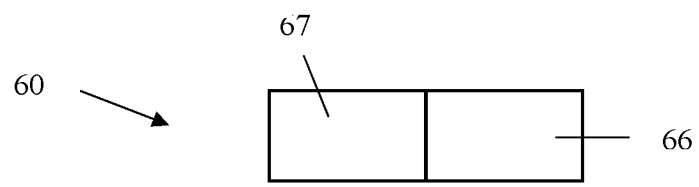
FIG. 5 illustrates an additive package including a solid hydrogen sulfide scavenger disposed in at least one of a plurality of connected but individually sealed pouches.
Figure 6:
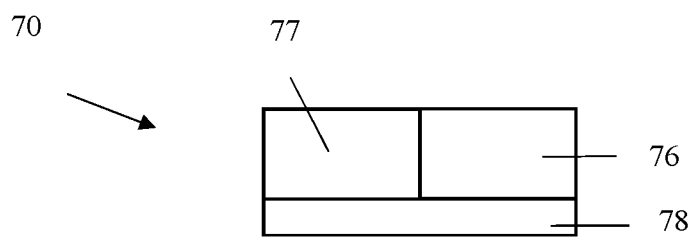
FIG. 6 illustrates an additive package including a solid hydrogen sulfide scavenger disposed in at least one of the three connected but individually sealed pouches.

FIGS. 5 and 6 illustrate additive packages (60, 70) having a solid hydrogen sulfide scavenger encapsulated in at least one of a plurality of connected but individually sealed pouches (66, 67, 76, 77, 78).

The individually sealed pouches may have different shapes such as a sphere, a cylinder, a rectangular cuboid, a cube, and an irregular shape. The largest dimension of each sealed pouches can be about 0.5 cm to about 100 cm, preferably about 2 cm to about 30 cm, more preferably about 2 cm to about 5 cm or about 5 cm to about 20 cm.

The solid hydrogen sulfide scavenger comprises a zinc compound, a copper compound, an iron compound, an aluminum compound, or a combination comprising at least one of the foregoing.

Examples of a zinc compound include zinc sulfonate, zinc carbonate, zinc oxide, zinc sulfide, and zinc borate. An example of an iron compound is iron oxide. An example of an aluminum compound is aluminum oxide. Examples of the copper compound include caesium hexafluorocuprate (IV), calcium copper titanate, chlorophyllin, chromated copper arsenate, copper aspirinate, copper benzoate, copper chromite, copper gluconate, copper hydride, copper ibuprofenate, copper indium gallium selenide, copper monosulfide, copper oxide, copper peptide GHK-Cu, copper peroxide, copper salicylate, copper selenide, copper silicide, copper sulfide, copper usnate, copper (I) acetylide, copper(I) bromide, copper (I) chloride, copper(I) cyanide, copper(I) fluoride, copper (I) hydroxide, copper(I) iodide, copper (I) nitrate, copper (I) oxide, copper (I) phosphide, copper (I) sulfate, copper (I) sulfide, copper (I) thiocyanate, copper (I)-thiophene-2-carboxylate, copper (II) acetate, copper (II) arsenate, copper (II) azide, copper (II) bromide, copper (II) carbonate, basic copper carbonate, copper (II) chloride, copper (II) fluoride, copper (II) hydroxide, copper (II) nitrate, copper (II) oxide, copper (II) perchlorate, copper (II)

phosphate, copper (II) selenite, copper (II) sulfate, copper (II) tetrafluoroborate, copper (II) triflate, copper (III) oxide, cuprate, copper borate, copper carboxylate, or a combination comprising at least one of the foregoing.

The solid hydrogen sulfide scavengers can be present in an amount of about 0.5 wt % to about 99.99 wt %, about 1 wt. % to about 99.99 wt %, about 10 wt % to about 99.99 wt %, about 20 wt % to about 99.99 wt %, about 40 wt % to about 99.99 wt %, about 50 wt % to about 99.99 wt %, preferably about 75 wt % to about 99.5 wt %, more preferably about 85 wt % to about 99.5 wt % or about 95 wt % to about 99.5 wt %, each based on the total weight of the additive packages.

The solid hydrogen sulfide scavengers can be present in the form of micron-sized particles or nano-sized particles. The largest dimension of the solid hydrogen sulfide scavengers can also be up to about 5 centimeters.

Other than hydrogen sulfide scavengers, the additive packages can also include additives such as crosslinking agents, dispersing agents, elastomers, plastomers, antioxidants, extenders, antistripping additives, stiffening agents, acids, gilsonite, softening agents, wax-based additives, and rejuvenating agents, or a combination comprising at least one of the foregoing. Other known additives for asphalt and bitumen compositions can also be included in the additive packages. These additives can be included in the same sealed pouch as the solid hydrogen sulfide scavengers if they are compatible with each other. Alternatively or in addition, the additives can be included in different sealed pouch as the solid hydrogen sulfide scavengers. The arrangement allows for otherwise incompatible additives be formulated together, stored, and shipped conveniently.

Examples of crosslinking agents include sulfur, organic peroxides such as dibenzoylperoxide and dicumylperoxide, and mercapto functional silanes such as (3-mercaptopropyl) triethoxysilane. Examples of elastomers include natural rubber, styrene-butadiene rubber, styrene-butadiene-styrene, crumb rubber, and reactive elastomeric terpolymers (RETs). Examples of plastomers include low-density polyethylene (LDPE), high-density polyethylene (HDPE), and linear low-density polyethylene (LLDPE), polypropylene, ethylene-propylene copolymer, and ethylene and vinyl acetate copolymer (EVA). Lignin is a readily available antioxidant. The antistripping agents inoculate the compositions against moisture damage. Examples of antistripping agents include amines, amidoamines, imidazolines, polyamines, hydrated lime, organo-metallics, and acids. Examples of stiffening agents include polyphosphoric acid and gilsonite. Softening agents lower the viscosity of the aged binder, while rejuvenating agents are intended to restore the rheological and chemical properties of the agented binder. Examples of softening agents include asphalt flux oil, lube stock, and slurry oil. The wax-based additives can be a natural wax or a synthetic wax. Examples of suitable naturally occurring wax materials include beeswax, candelilla wax, carnauba wax, ozokerite wax, ceresine wax, montan wax. Synthetic waxes include paraffin waxes under the tradename Sasobit™. Examples of rejuvenating agents include lubricating and extender oils, which contain a high proportion of maltenes and low saturates contends that do not react with asphaltenes.

As a specific example the solid hydrogen sulfide scavenger in the additive package comprises a copper compound and the additive comprises polyphosphoric acid, where the copper compound and the polyphosphoric acid are included in the same or different individually sealed pouches.

A "form, fill, and seal" packaging device can be used to prepare the additive packages. Machines used to make the additive packages include commercially available vertical form, fill, and seal machines. During the form, fill, and seal process, solid hydrogen sulfide scavengers and/or other additives can be added into the same or different pouches. With this process, solid hydrogen sulfide scavengers and other additives can be encapsulated in the same pouch or separately encapsulated in different connecting pouches. The pouches can be sealed with methods known in the art. For example, the pouches can be sealed with heat, pressure, and/or adhesive. To make additive packages having a first sealed pouch and a second sealed pouch disposed in the first sealed pouch, two vertical form, fill, and seal machines can be used. To make additive packages with multiple individually sealed pouches as illustrated in FIG. 5 and FIG. 6, commercially available thermoforming machines can be used.

Once the additive packages have been transported to a desired location, the sealed pouches can be either fully or partially removed by a physical process, a chemical process, or a combination thereof. In an aspect, the solid hydrogen sulfide scavenger and the optional additives are released by melting, disintegrating, degrading, or dissolving the pouch material.

The solid hydrogen sulfide scavenger can be released before the additive packages are introduced into asphalt or bitumen compositions, when the additive packages are introduced into asphalt or bitumen compositions, or after the additive packages are introduced into the asphalt or bitumen compositions.

In an aspect, the pouch material is dissolved, melted, disintegrated, or degraded when the additive packages are introduced into asphalt or bitumen compositions during the asphalt or bitumen manufacturing process, especially the mixing step. The process temperature are higher than the melting temperature or glass transition temperature, therefore, the pouch material can be melted or dissolved in the asphalt or bitumen.

Polar solvents and/or hydrocarbons can be used to dissolve the pouch material. Exemplary polar solvents include methanol, ethanol, propanol, hexanol, octanol, hexylene glycol, water, or a combination comprising at least one of the foregoing. Water can be in the form of steam. Examples of hydrocarbons include crude oils and finished fuels such as diesel and fuel oil.

Optionally the pouch material is dissolved in the presence of an acid or base catalyst. Exemplary acid catalysts include acetic acid, p-toluenesulfonic acid, carbonic acid, $CO_2$, HCl, $H_2S$, $H_2SO_4$, $H_3PO_4$, or a combination comprising at least one of the foregoing. Exemplary base catalysts include NaOH, KOH, $Na_2CO_3$, $K_2CO_3$, ammonia, $NaHCO_3$, $KHCO_3$, or a combination comprising at least one of the foregoing. When an acid or base catalyst is used, the pouch material can be dissolved in a much faster rate. If desired, a rinse process with alcohols such as methanol, ethanol, propanol, hexanol, octanol, hexylene glycol, and/or water or a neutralization process can be used to remove the residual acid/base catalysts after the pouch material is dissolved. Any neutralization process known to a person skilled in the art can be used. For example, one can use an acid to neutralize a base and use a base to neutralize an acid.

As used herein, dissolving the pouch material includes decomposing the pouch material and dissolving the decomposed material in the polar solvent as disclosed herein or in hydrocarbons that contain the polar solvent, for example, crude oils, and finished fuels such as gasoline and diesel.

One of the exemplary decomposing processes includes hydrolyzing the pouch material in water. Dissolving the pouch material also includes the embodiments where the pouch material is dissolved without degradation.

The temperature of the polar solvent used to melt or dissolve the pouch material is not particularly limited, and can be about 20 to about 250° C., about 40 to about 250° C., or about 50 to about 250° C. Preferably the pouch material is melted or dissolved at a temperature of about 90 to about 200° C., about 120 to about 200° C., or about 150 to about 200° C.

Also disclosed herein are compositions containing an additive package as disclosed herein and asphalt. The asphalt can comprise naturally occurring bitumens or kerogens or residues from petroleum refining, or a combination comprising at least one of the foregoing.

Set forth below are various embodiments of the disclosure.

Embodiment 1. A method of reducing hydrogen sulfide emissions from an asphalt or bitumen composition, the method comprising: releasing a solid hydrogen sulfide scavenger from an additive package, the additive package comprising the solid hydrogen sulfide scavenger disposed in a sealed pouch; and contacting the asphalt or bitumen composition with the solid hydrogen sulfide scavenger released from the additive package; wherein the sealed pouch is formed from a pouch material, which includes an polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing.

Embodiment 2. The method as in any prior embodiment, wherein releasing the solid hydrogen sulfide scavenger comprises melting, disintegrating, degrading, or dissolving the pouch material.

Embodiment 3. The method as in any prior embodiment, wherein the pouch material is degraded or dissolved with a polar solvent or a hydrocarbon.

Embodiment 4. The method as in any prior embodiment, further comprising blending the additive package and the asphalt or bitumen composition; wherein the solid hydrogen sulfide scavenger is released when the additive package is blended with the asphalt or bitumen composition or after the additive package is blended with the asphalt or bitumen composition.

Embodiment 5. The method as in any prior embodiment, wherein the solid hydrogen sulfide scavenger comprises a zinc compound, a copper compound, an iron compound, an aluminum compound, or a combination comprising at least one of the foregoing.

Embodiment 6. The method as in any prior embodiment, wherein the additive package comprises a plurality of sealed pouches, and the solid hydrogen sulfide scavenger is disposed in at least one of the plurality of the sealed pouches.

Embodiment 7. The method as in any prior embodiment, wherein adjacent sealed pouches are connected.

Embodiment 8. The method as in any prior embodiment, wherein the additive package further comprises a second sealed pouch disposed inside the sealed pouch.

Embodiment 9. The method as in any prior embodiment, wherein the additive package further comprises an additive disposed in the same or different sealed pouch as the solid hydrogen sulfide scavenger, the additive comprising a cross-linking agent, a dispersing aid, an elastomer, a plastomer, an antioxidant, an extender, an antistripping additive, a stiffening agent, an acid, gilsonite, a softening agent, a wax-based additive, a rejuvenating agent, or a combination comprising at least one of the foregoing.

Embodiment 10. The method as in any prior embodiment, wherein the sealed pouch has two or more layers, and at least one layer comprises the pouch material.

Embodiment 11. The method as in any prior embodiment, wherein the sealed pouch has an inner surface and an opposing outer surface, and a coating is disposed on at least one of the inner and outer surfaces of the sealed pouch, the coating comprising a wax, a silicone, or a combination comprising at least one of the foregoing.

Embodiment 12. An additive package comprising a solid hydrogen sulfide scavenger disposed in a sealed pouch, wherein the sealed pouch is formed from a pouch material, which includes an polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing.

Embodiment 13. The additive package as in any prior embodiment comprising a plurality of sealed pouches, and the solid hydrogen sulfide scavenger is disposed in at least one of the plurality of the sealed pouches.

Embodiment 14. The additive package as in any prior embodiment, further comprising an additive, wherein the additive and the solid hydrogen sulfide scavenger are disposed in the same sealed pouch. The additive can include polyphosphoric acid, and the solid hydrogen sulfide scavenger includes a copper compound as disclosed herein.

Embodiment 15. The additive package of claim 13, further comprising an additive, wherein the additive and the solid hydrogen sulfide scavenger are disposed in different sealed pouches. The additive can include polyphosphoric acid, and the solid hydrogen sulfide scavenger includes a copper compound as disclosed herein.

Embodiment 16. A composition comprising an additive package of as in any prior embodiment, and asphalt.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method of reducing hydrogen sulfide emissions from an asphalt or bitumen composition, the method comprising:
   releasing a solid hydrogen sulfide scavenger from an additive package, the additive package comprising the solid hydrogen sulfide scavenger disposed in a sealed pouch wherein the sealed pouch has a size from 2 to 100 cm;
   blending the additive package and the asphalt or bitumen composition; wherein the solid hydrogen sulfide scavenger is released when the additive package is blended with the asphalt or bitumen composition or after the additive package is blended with the asphalt or bitumen composition; and contacting the asphalt or bitumen composition with the solid hydrogen sulfide scavenger released from the additive package;

wherein the sealed pouch is formed from a pouch material, which includes a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing.

2. The method of claim 1, wherein releasing the solid hydrogen sulfide scavenger comprises melting, disintegrating, degrading, or dissolving the pouch material.

3. The method of claim 2, wherein the pouch material is degraded or dissolved with a polar solvent or a hydrocarbon.

4. The method of claim 1, wherein the solid hydrogen sulfide scavenger comprises a zinc compound, a copper compound, an iron compound, an aluminum compound, or a combination comprising at least one of the foregoing.

5. The method of claim 1, wherein the additive package comprises a plurality of sealed pouches, and the solid hydrogen sulfide scavenger is disposed in at least one of the plurality of the sealed pouches.

6. The method of claim 5, wherein adjacent sealed pouches are connected by the pouch material.

7. The method of claim 1, wherein the additive package further comprises a second sealed pouch disposed inside the sealed pouch.

8. The method of claim 1, wherein the additive package further comprises an additive disposed in the same or different sealed pouch as the solid hydrogen sulfide scavenger, the additive comprising a crosslinking agent, a dispersing aid, an elastomer, a plastomer, an antioxidant, an extender, an antistripping additive, a stiffening agent, an acid, gilsonite, a softening agent, a wax-based additive, a rejuvenating agent, or a combination comprising at least one of the foregoing.

9. The method of claim 1, wherein the sealed pouch has two or more layers, and at least one layer comprises the pouch material.

10. The method of claim 1, wherein the sealed pouch has an inner surface and an opposing outer surface, and a coating is disposed on at least one of the inner and outer surfaces of the sealed pouch, the coating comprising a wax, a silicone, or a combination comprising at least one of the foregoing.

11. The method of claim 1 wherein the sealed pouch has a single layer structure or a multilayer structure and has an inner surface and an outer surface where the inner surface defines an interior of the sealed pouch containing a plurality of particles of the hydrogen sulfide scavenger.

12. The method of claim 11 wherein the particles are micro or nanosized.

* * * * *